United States Patent
Froehlich

(10) Patent No.: US 11,161,377 B2
(45) Date of Patent: Nov. 2, 2021

(54) SYSTEM AND METHOD FOR MONITORING TIRE CONDITIONS

(71) Applicant: Huf Hülsbeck & Fürst GmbH & Co. KG, Velbert (DE)

(72) Inventor: Matthias Froehlich, Royal Oak, MI (US)

(73) Assignee: Huf Baolong Electronics Bretten GmbH, Bretten (DE)

( * ) Notice: Subject to any disclaimer, the term of this patent is extended or adjusted under 35 U.S.C. 154(b) by 0 days.

(21) Appl. No.: 16/506,052

(22) Filed: Jul. 9, 2019

(65) Prior Publication Data

US 2020/0031179 A1 Jan. 30, 2020

Related U.S. Application Data

(60) Provisional application No. 62/703,451, filed on Jul. 26, 2018.

(51) Int. Cl.
*B60C 23/00* (2006.01)
*B60C 23/04* (2006.01)

(52) U.S. Cl.
CPC ...... *B60C 23/0433* (2013.01); *B60C 23/0401* (2013.01); *B60C 23/0415* (2013.01)

(58) Field of Classification Search
CPC ............ B60C 23/0433; B60C 23/0401; B60C 23/0415; B60C 23/0437; B60C 23/0444; B60C 23/0462; B60C 23/0483
See application file for complete search history.

(56) References Cited

U.S. PATENT DOCUMENTS

| | | | | |
|---|---|---|---|---|
| 6,970,076 B1 * | 11/2005 | Starkey | ............... | B60C 23/0433 340/442 |
| 2006/0111829 A1 * | 5/2006 | Williams | ............... | B60R 21/013 701/79 |
| 2006/0169414 A1 * | 8/2006 | Hillman | ................ | B60C 25/138 157/1 |
| 2011/0140876 A1 * | 6/2011 | Deniau | ............... | B60C 23/0408 340/445 |
| 2014/0148990 A1 * | 5/2014 | Fink | ...................... | B60C 23/007 701/29.4 |
| 2015/0015390 A1 * | 1/2015 | McIntyre | ............ | B60C 23/0471 340/447 |

(Continued)

*Primary Examiner* — Hai Phan
*Assistant Examiner* — Anthony D Afrifa-Kyei
(74) *Attorney, Agent, or Firm* — Honigman LLP; Matthew H. Szalach

(57) ABSTRACT

A tire pressure monitoring device includes a display, a receiver, a memory, and a processor. The receiver is configured to receive a first signal from a first sensor and a second signal from a second sensor. The memory stores a first and second communication protocols corresponding to the first and second sensors, respectively. The processor is in communication with the display, the receiver, and the memory and is configured to perform operations. The operations include selecting the first and second communication protocols based on the first and second signals, respectively, converting the first and second signals into first and second sets, respectively, of at least one of temperature data or pressure data corresponding to a first tire, and transmitting the first set and the second set of at least one of temperature data or pressure data to the display.

9 Claims, 6 Drawing Sheets

(56) References Cited

U.S. PATENT DOCUMENTS

| | | | |
|---|---|---|---|
| 2015/0042464 A1* | 2/2015 | Yu | B60C 23/0415 |
| | | | 340/447 |
| 2015/0231936 A1* | 8/2015 | Keller | B64C 25/36 |
| | | | 340/442 |
| 2017/0190225 A1* | 7/2017 | Yu | B60C 23/0483 |
| 2019/0152277 A1* | 5/2019 | Hassani | B60C 23/0418 |
| 2019/0230615 A1* | 7/2019 | Werner | H04W 4/48 |

* cited by examiner

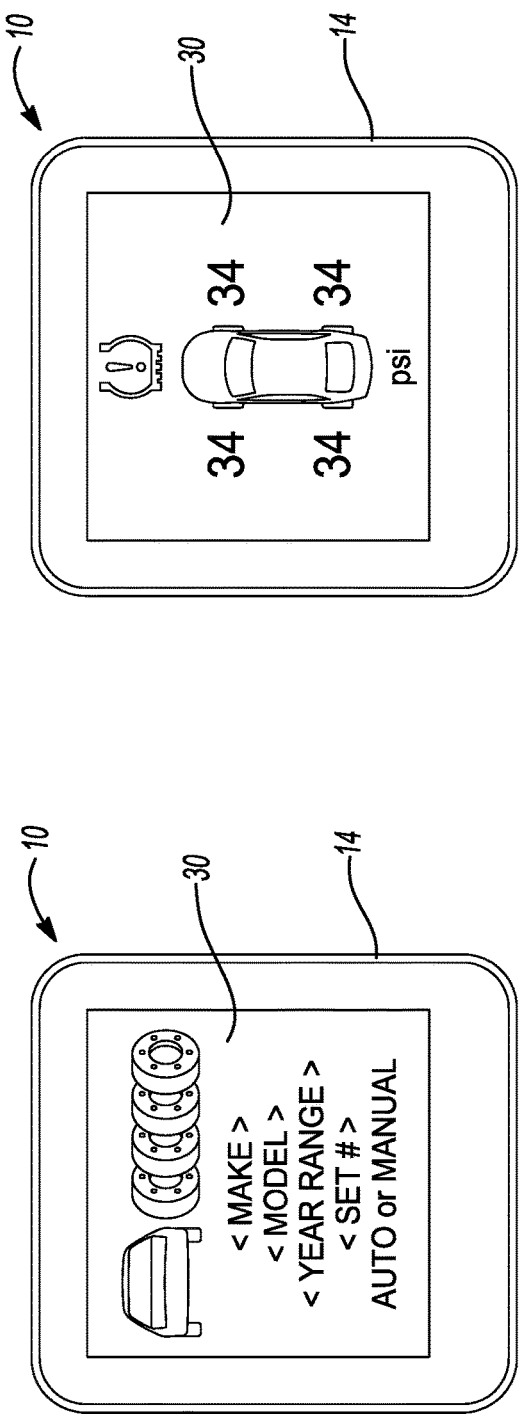
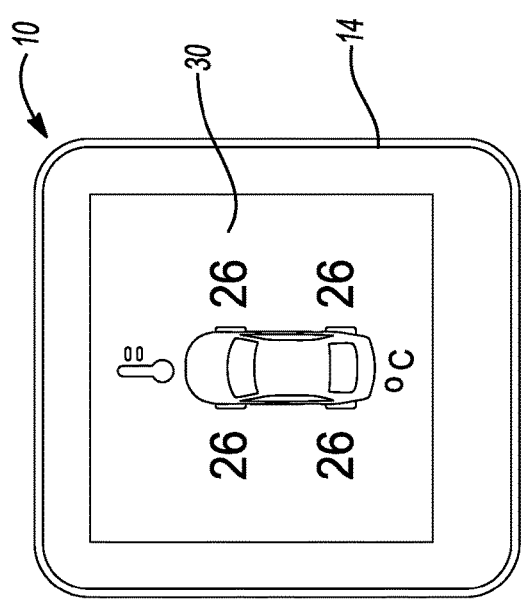
Fig-5
Fig-6
Fig-7

SYSTEM AND METHOD FOR MONITORING TIRE CONDITIONS

CROSS REFERENCE TO RELATED APPLICATIONS

This non-provisional U.S. patent application claims priority under 35 U.S.C. § 119(e) to U.S. Provisional Patent Application Ser. No. 62/703,451, filed Jul. 26, 2018, the disclosure of which is hereby incorporated by reference in its entirety.

FIELD

The present disclosure relates generally to a system and method for monitoring tire conditions, and more particularly to a system and method for monitoring pressure and temperature at one or more tires of a vehicle.

BACKGROUND

This section provides background information related to the present disclosure and is not necessarily prior art.

Tire pressure monitoring (TPM) systems typically include a TPM display device and one or more TPM sensors. Each sensor is associated with a tire of a vehicle and in communication with the TPM device, such that the TPM system can monitor various conditions at the tires by transmitting data from the TPM sensors to the TPM device. For example, a TPM system can be used to monitor the pressure of, or temperature at, a tire through the use of the sensors associated with each tire.

Conventional TPM systems are either installed by the vehicle manufacturer (e.g., an OE TPM system) or installed by a user of the vehicle as an aftermarket addition (e.g., an aftermarket TPM system, such as a retro-fit kit) to the vehicle. Such conventional TPM systems communicate and function with specific TPM system protocols. For example, an OE TPM system may include an OE TPM display device that communicates with specific OE TPM sensors, while an aftermarket TPM system may include an aftermarket TPM display device that communicates with specific aftermarket TPM sensors. In this regard, the OE TPM display device may not communicate or function with the aftermarket TPM sensors, and the aftermarket TPM display device may not communicate or function with the OE TPM sensors.

While known TPM systems may be acceptable for their intended purposes, a continuous need for improvement in the relevant art remains.

SUMMARY

This section provides a general summary of the disclosure, and is not a comprehensive disclosure of its full scope or all of its features.

One aspect of the disclosure provides a tire pressure monitoring device. The tire pressure monitoring device may include a display, a receiver, a memory, and a processor. The receiver may be configured to receive a first signal from a first sensor and a second signal from a second sensor. The memory may include a first communication protocol corresponding to the first sensor and a second communication protocol corresponding to the second sensor. The processor may be in communication with the display, the receiver, and the memory and configured to perform operations. The operations may include selecting the first communication protocol based on the first signal, selecting the second communication protocol based on the second signal, converting the first signal into a first set of at least one of temperature data or pressure data corresponding to a first tire, converting the second signal into a second set of at least one of temperature data or pressure data corresponding to the first tire, and transmitting the first set and the second set of at least one of temperature data or pressure data to the display.

Implementations of the disclosure may include one or more of the following optional features. In some implementations, the first sensor corresponds to a first original equipment manufacturer and the second sensor corresponds to second original equipment manufacturer.

In some implementations, the first communication protocol is different than the second communication protocol. The first communication protocol may correspond to a first original equipment manufacturer and the second communication protocol may correspond to a second original equipment manufacturer. In some implementations, the processor is configured to convert the first signal and the second signal into temperature data and pressure data based on vehicle-specific conversion information. The vehicle-specific conversion information may include a year of manufacture, a make of manufacture, a model of manufacture of a vehicle, and/or a qualifier, such as the material (e.g., steel or alloy) used to manufacture the wheels.

In some implementations, the processor stores tire-specific conversion information, and converts the first signal and the second signal into temperature and pressure data based on the tire-specific conversion information. The tire-specific conversion information may correspond to a first type of tire. The tire-specific conversion information may correspond to a second type of tire different than the first type of tire.

In some implementations, the tire pressure monitoring device includes a power unit removably engaged with a power source of a vehicle. The power source of the vehicle may include a USB port. In some implementations, the power source of the vehicle includes an auxiliary power receptacle.

Another aspect of the disclosure provides a method for linking tire sensors with a tire pressure monitoring device. The method may include monitoring a first tire pressure corresponding to a first tire of a vehicle, and monitoring a second tire pressure corresponding to a second tire of a vehicle. The method may also include determining whether the first tire pressure is different than the second tire pressure. The method may further include receiving, by a tire pressure monitoring device, a signal from a first sensor corresponding to one of the first tire or the second tire, and receiving, by the tire pressure monitoring device, a signal from a second sensor corresponding to one of the first tire or the second tire. The method may also include saving, by the tire pressure monitoring device, a location of the first sensor relative to the first tire and the second tire based on the tire pressure of the first tire and the second tire, and saving, by the tire pressure monitoring device, a location of the second sensor relative to the first tire and the second tire based on the tire pressure of the first tire and the second tire.

This aspect may include one or more of the following optional features. In some implementations, the method includes displaying, by the tire pressure monitoring device, the tire pressure corresponding to the first tire and the tire pressure corresponding to the second tire.

In some implementations, the first tire includes a left front tire and the second tire includes a right front tire. The left front tire may include a tire pressure less than a tire pressure of the right front tire.

In some implementations, the method includes modifying one of the tire pressure of the first tire or the tire pressure of the second tire such that the tire pressure of the first tire equals the tire pressure of the second tire after the location of the first sensor and the second sensor is saved by the tire pressure monitoring device.

In some implementations, the first sensor and the second sensor correspond to a first original equipment manufacturer. The tire pressure monitoring device may be capable of receiving signals from a third sensor and a fourth sensor corresponding to a second original equipment manufacturer.

In some implementations, the tire pressure monitoring device includes a power unit removably engaged with a power source of the vehicle. The power source of the vehicle may include a USB port or an auxiliary power receptacle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

FIG. 5 is a plan view of an example TPM display device, including a display in a first mode of operation in accordance with the principles of the present disclosure;

FIG. 6 is a plan view of the TPM display device of FIG. 5, including the display in a second mode of operation in accordance with the principles of the present disclosure;

FIG. 7 is a plan view of the TPM display device of FIG. 5, including the display in a third mode of operation in accordance with the principles of the present disclosure.

Corresponding reference numerals indicate corresponding parts throughout the drawings.

DETAILED DESCRIPTION

Figure 1A:
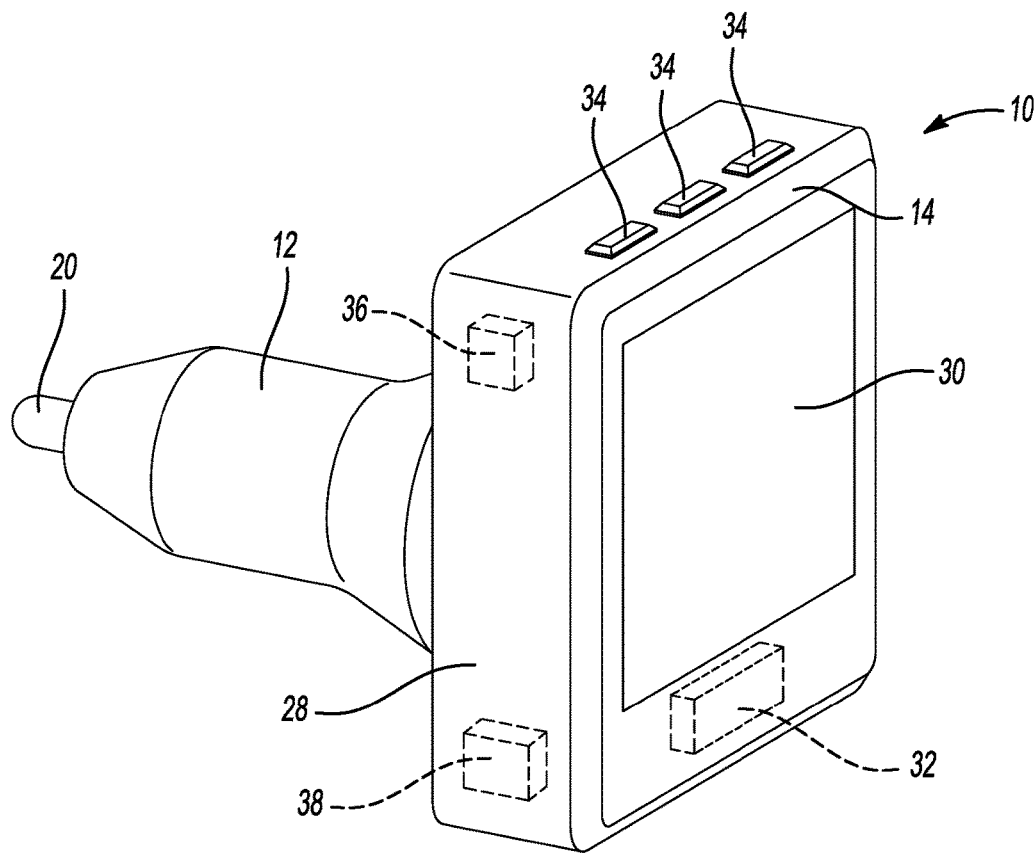
FIG. 1A is a perspective view of an example TPM display device having a universal serial bus adapter in accordance with the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Figure 1B:
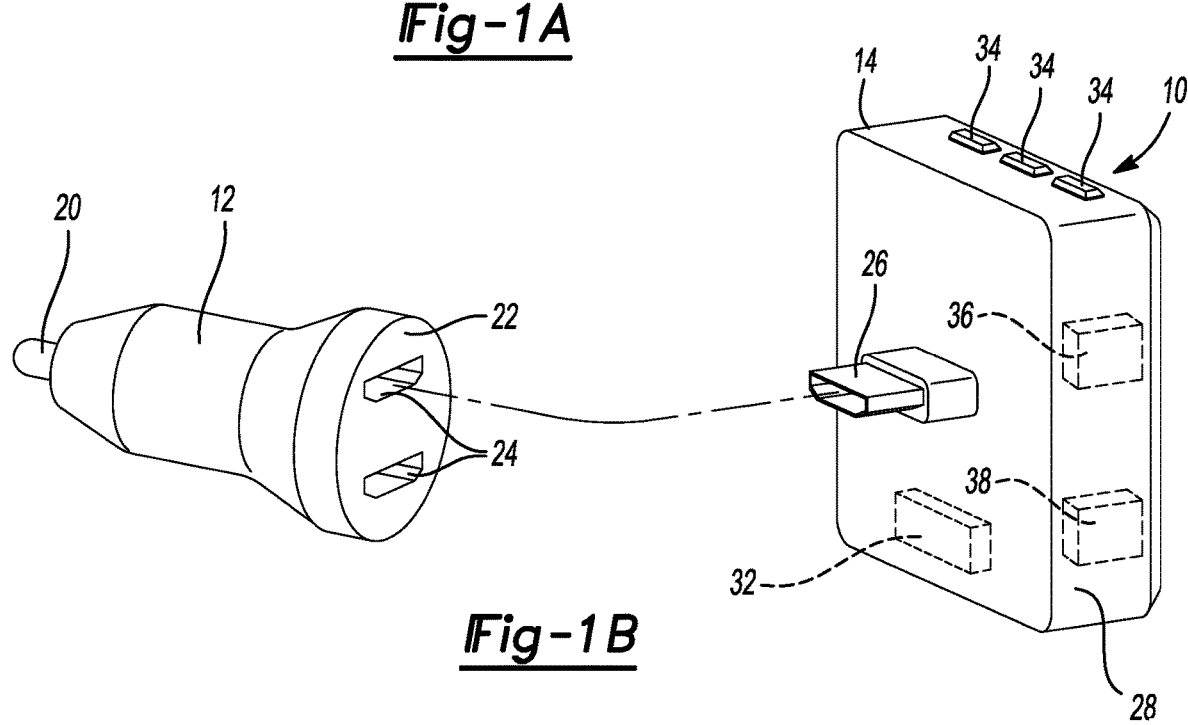
FIG. 1B is an exploded view of the TPM display device of FIG. 1A.

With reference to FIGS. 1A-1B, a tire pressure monitoring (TPM) device 10 is illustrated and may include a power unit 12 and a display unit 14. As will be described in more detail herein, the TPM device 10 may be utilized in or with a vehicle (e.g., vehicle 16 of FIGS. 3 and 4) having a TPM system that includes the TPM device 10 and one or more TPM sensors. For example, the TPM device 10 may be utilized with a TPM system to monitor one or more conditions (e.g., pressure, temperature, rotational direction, etc.) at, or associated with, one or more tires of a vehicle (e.g., vehicle 16 of FIGS. 3 and 4).

As illustrated in FIG. 1B, the power unit 12 may include a power input end 20 and a power output end 22. During operation, electrical power may be transmitted through the power unit 12 from the input end 20 to the output end 22.

While the power input end 20 is illustrated as being compatible with an auxiliary power outlet (e.g., a cigarette lighter outlet), it will be appreciated that the power input end 20 may include other forms (e.g., a 2-prong or 3-prong alternating current adapter) within the scope of the present disclosure. The output end 22 may include one or more plugs or receptacles 24 for receiving or mating with a corresponding receptacle or plug 26 of the display unit 14. In this regard, while the receptacles 24 and the plugs 26 are generally illustrated as being micro universal serial bus adapters, it will be appreciated that the receptacles 24 or plugs 26 may include other forms of adapters (e.g., USB A-type, USB B-type, USB Mini-b, etc.) configured to transmit power or data to the display unit 14 within the scope of the present disclosure.

With further reference to FIGS. 1A and 1B, the display unit 14 may include the plug 26, a housing 28, a display 30, a processing system 32, one or more user input members 34, one or more wireless communication nodes 36, and a secondary power source 38 (e.g., a battery). The user input member 34 may include a touchscreen (e.g., display 30), buttons, a microphone, or any other type of user input member. As will be explained in more detail below, the plug 26 may communicate with the processing system 32 and the display 30, and the processing system 32 may communicate with the display 30 and the user input member 34, to transmit or store power or data throughout the display unit 14. For example, the plug 26 may transmit power or data to the processing system 32, while the processing system 32 may transmit data to the display 30 for visualization and use by a user. The user input member 34 may transmit data and user selections to the processing system 32 or the display 30. In some implementations, the plug 26 may transmit power to the secondary power source 38 (e.g., the battery). Accordingly, the secondary power source 38 can be charged via the plug 26 and used, instead of the plug, to provide power to the other portions (e.g., the processing system 32) of the display unit 14.

The wireless communication node(s) 36 may communicate with one another, or with a personal communication device (not shown), such as a smartphone, a smartwatch, a tablet computing device, or other suitable computing device, through one or more wired and/or wireless communication protocols, such as short-range radio wave communication, BLUETOOTH®, and/or BLUETOOTH® low energy (BLE) (e.g., Mesh BLE or scatternet BLE). In particular, the display unit 14 may include a communication application in communication with a corresponding communication application of the personal communication device through the wireless communication node(s) 36 and one or more communication nodes of the personal communication device, such that a user can transmit data and user selections to the processing system 32 or the display 30 through the personal communication device and/or the user input member 34.

Figure 2:
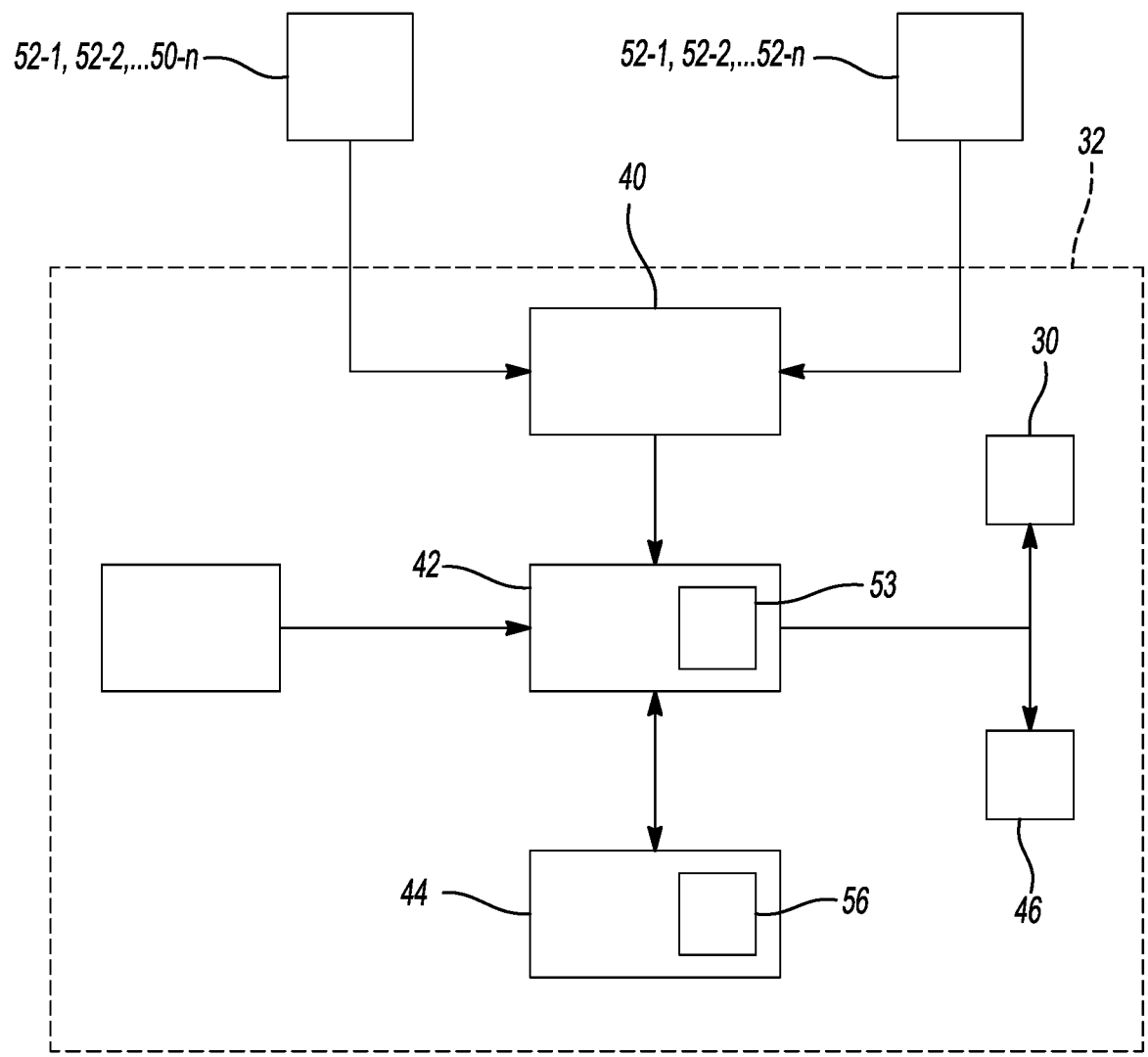
FIG. 2 is a functional block diagram of an example implementation of a TPM system in accordance with the principles of the present disclosure.

With reference to FIG. 2, an example implementation of the processing system 32 includes a receiver 40, data processing hardware (e.g., processor 42), a memory 44, one or more indicators 46, one or more primary sensors 50-1, 50-2, . . . 50-n, and one or more secondary sensors 52-1, 52-2, . . . 52-n. The receiver 40 may communicate with the primary sensors 50-1, 50-2, . . . 50-n or the secondary sensors 52-1, 52-2, . . . 52-n through one or more wireless communication protocols. For example, in some implementations, the receiver 40 communicates wirelessly (e.g., radiofrequency (RF)) with the primary sensors 50-1, 50-2, . . . 50-n and the secondary sensors 52-1, 52-2, . . . 52-n through the 315 MHz RF protocol, the 433 MHz RF protocol, or a dual frequency protocol to receive data and information the primary sensors 50-1, 50-2, . . . 50-n or the secondary sensors 52-1, 52-2, . . . 52-n. In some implementations, the primary sensors 50-1, 50-2, . . . 50-n are air pressure sensors, while the secondary sensors 52-1, 52-2, . . . 52-n are temperature sensors, such that the receiver 40 receives air pressure data and temperature data from the primary sensors 50-1, 50-2, . . . 50-n and the secondary sensors 52-1, 52-2, . . . 52-n, respectively. It will be appreciated that the sensors 50-n, 52-n make capture other information (e.g., rotational direction of a tire) within the scope of the present disclosure.

The processor 42 may (a) generate, (b) store, (c) use, or (d) export various data through one or more operations based on a control program (e.g., a protocol) corresponding to the sensors 50-n, 52-n. In this regard, the processor 42 may include a program memory 53 having a selectable or executable control program that corresponds to the sensors 50-n, 52-n. As will be explained in more detail below, during operation, the processor 42 may (i) select an appropriate control program (e.g., a communication protocol corresponding to the sensors 50-n, 52-n) from a plurality of control programs saved to the memory 44, and (ii) load the control program into the program memory 53 for use and execution thereof. In some implementations, the processor 42 may select an appropriate control program from the memory 44, and load the control program into the program memory 53, based on a signal (e.g., an identification code) transmitted from one or more of the sensors 50-n, 52-n. In some implementations, the processor 42 may select an appropriate control program from the memory 44, and load the control program into the program memory 53, based on data selected by a user of the device 10. For example, the user may input information into the device 10 through the user input members 34. In particular, the user may input information corresponding to the year, make, or model of the vehicle on which the sensors 50-n, 52-n are disposed, and the processor 42 may select the control program from the memory 44 based on such information. In particular, the processor 42 may identify or otherwise select the control program from the memory 44 automatically, and without additional input or data. The processor 42 may utilize or decode the signals transmitted by the sensors 50-n, 52-n based on the control program selected from the memory 44 and loaded into the program memory 53.

As previously described, the memory 44 (e.g., memory hardware) may store instructions that when executed on the processor 42 cause the processor 42 to perform the various operations. The operations executable by the processor 42 may include, but are not limited to, encryption, decryption, verification, authorization, signal generation, calibration, etc. In this regard, the memory 44 may store a plurality of instructions or control programs (e.g., communication protocols), each corresponding to a particular sensor 50-n, 52-n. For example, the memory 44 may store a first control program corresponding to a sensor 50-n, 52-n manufactured, sold, or otherwise corresponding to a vehicle sold by a first original equipment manufacturer (e.g., GENERAL MOTORS®), a second control program corresponding to a sensor 50-n, 52-n manufactured, sold, or otherwise corresponding to a vehicle sold by a second original equipment manufacturer (e.g., FORD®), a third control program corresponding to a sensor 50-n, 52-n manufactured, sold, or otherwise corresponding to a vehicle sold my a third original equipment manufacturer (e.g., HONDA®), etc. In some implementations, the memory 44 stores instructions or control programs (e.g., communication protocols) corresponding to five sets of sensors 50-n, 52-n (e.g., 50-1, 52-1, and 50-2, 52-2, and 50-3, 52-3, and 50-4, 52-4, and 50-5, 52-5). In some implementations, each set of sensors 50-*n*, 52-*n* corresponds to the same original equipment manufacturer as one or more of the other sets of sensors, while in other implementations, each set of sensors 50-*n*, 52-*n* corresponds to a different original equipment manufacturer than one or more of the other sets of sensors.

In some implementations, the memory 44 includes at least one database 56 storing the plurality of communication protocols (e.g., the first control program, the second control program, the third control program, etc.) corresponding to the plurality of original equipment manufacturers. For example, the memory 44 may store the first communication protocol corresponding to a first type of primary sensors 50-*n* and a first type of secondary sensors 52-*n* from the first original equipment manufacturer, and a second communication protocol corresponding to a second type of primary sensors 50-*n* and second type of secondary sensors 52-*n* from the second original equipment manufacturer. In particular, the memory 44 may store any number of communication protocols corresponding to any number of types of primary sensors 50-*n* and secondary sensors 52-*n*. In this regard, each communication protocol, corresponding to one type of primary sensors 50-*n* or one type of secondary sensors 52-*n*, may differ from any number of other communication protocols corresponding to another type of primary sensors 50-*n* or another type of secondary sensors 52-*n*. For example, as previously described the first communication protocol may correspond to primary sensors 50-*n* or secondary sensors 52-*n* corresponding to a particular vehicle (e.g., vehicle 16) manufactured by GENERAL MOTORS®, while the second communication protocol may correspond to primary sensors 50-*n* or secondary sensors 52-*n* corresponding to a particular vehicle (e.g., vehicle 16) manufactured by FORD®. In some implementations, the memory 44 also stores communication protocols (e.g., a third communication protocol, a fourth communication protocol, etc.) corresponding to primary sensors 50-*n* and secondary sensors 52-*n* manufactured by any number of different aftermarket sensor manufacturers.

The indicator(s) 46 may be in communication with the processor 42 and may include any quantity and type of indicator (e.g., a light, a speaker, a motor, etc.) for providing a sensory (e.g., audio, visual, tactile) indication to a user (not shown) of the display unit 14. For example, upon receiving a signal from the processor 42, the indicator 46 may produce a sound, a light, or a vibration to identify an operation, or the result of an operation, performed by the processor 42.

Figure 3:
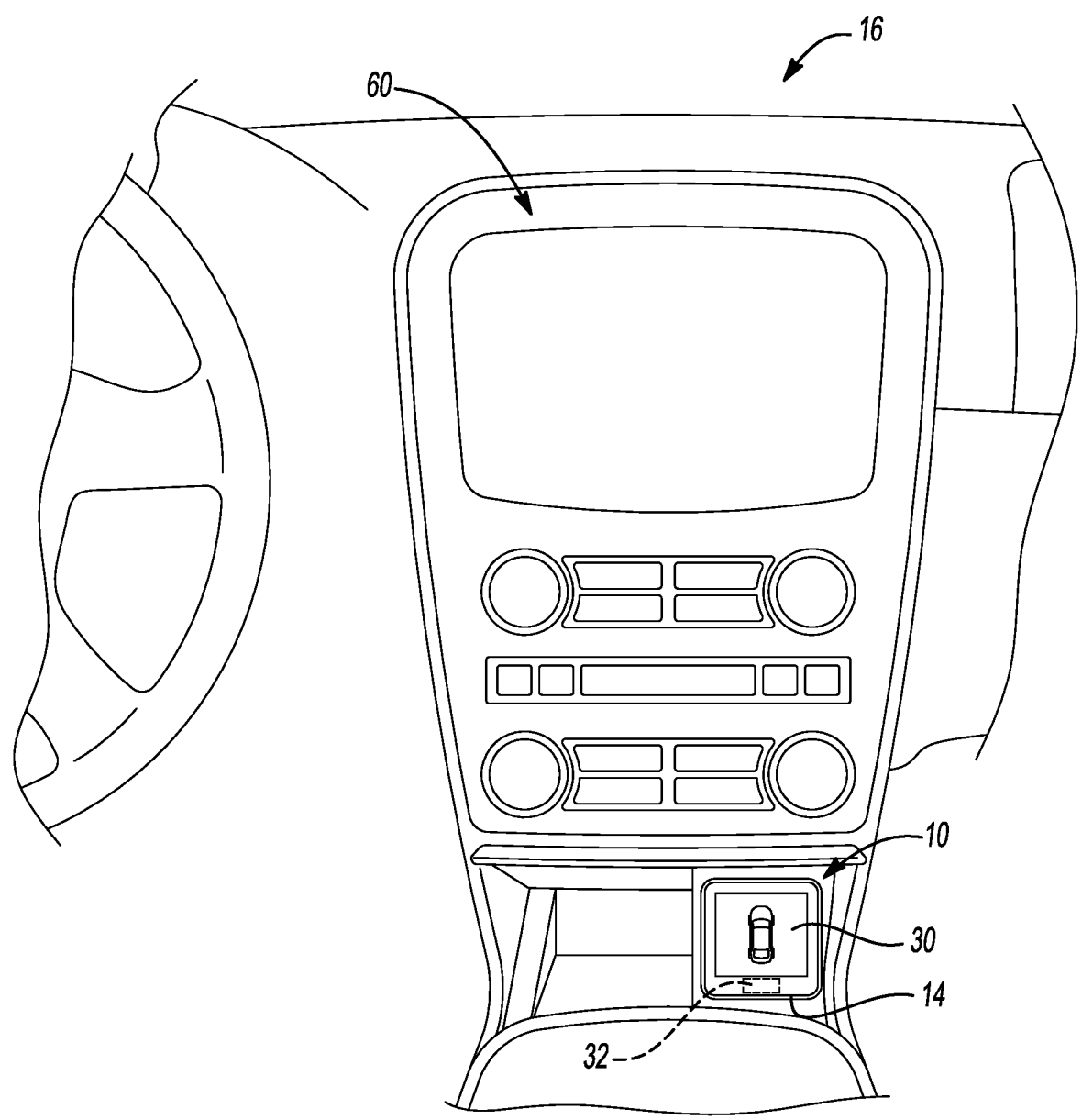
FIG. 3 is a perspective view of an example vehicle console including a TPM display device in accordance with the principles of the present disclosure.
Figure 4:
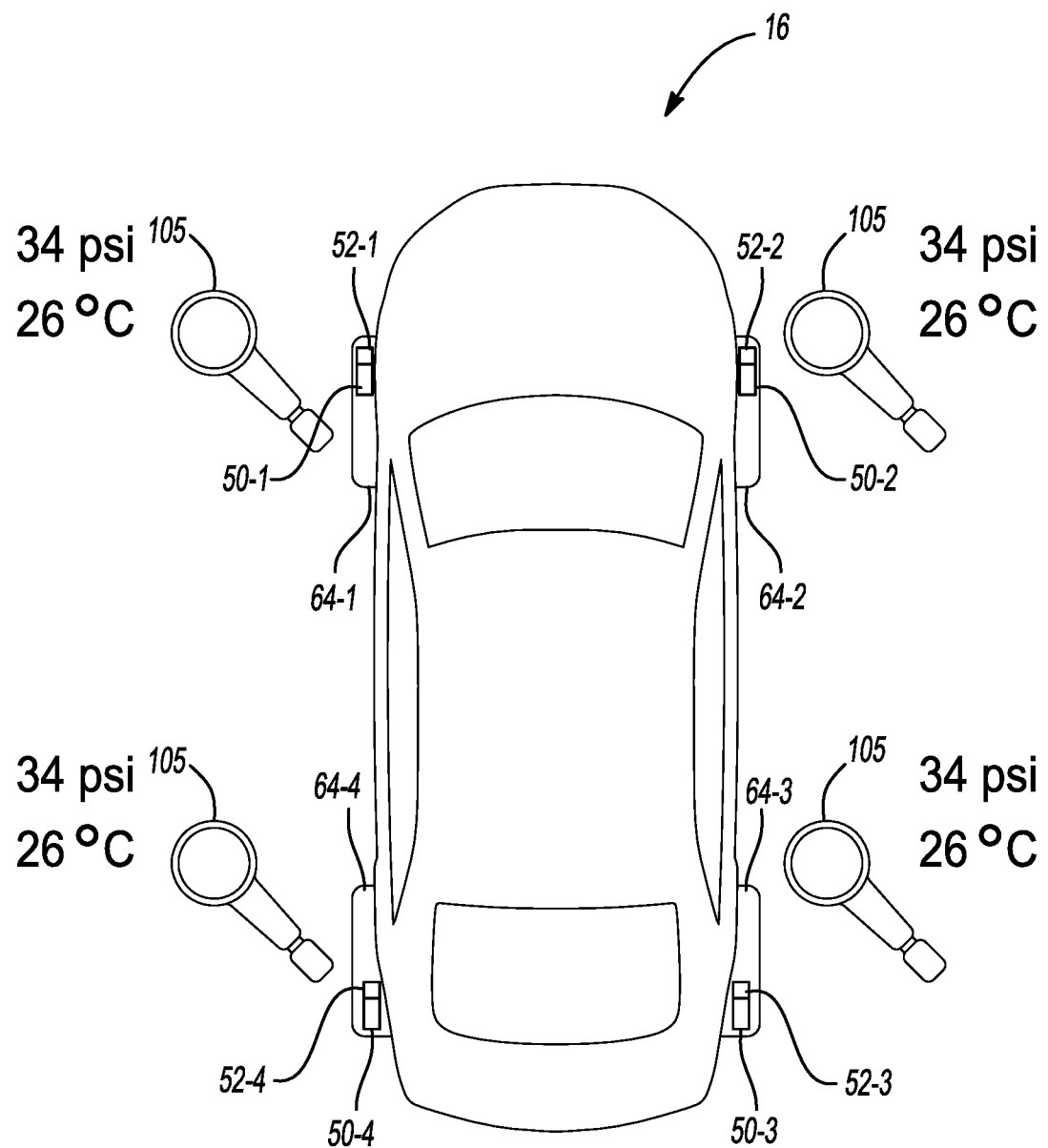
FIG. 4 is a schematic view of an example vehicle including TPM sensors for use with a TPM display device in accordance with the principles of the present disclosure.
Figure 8:
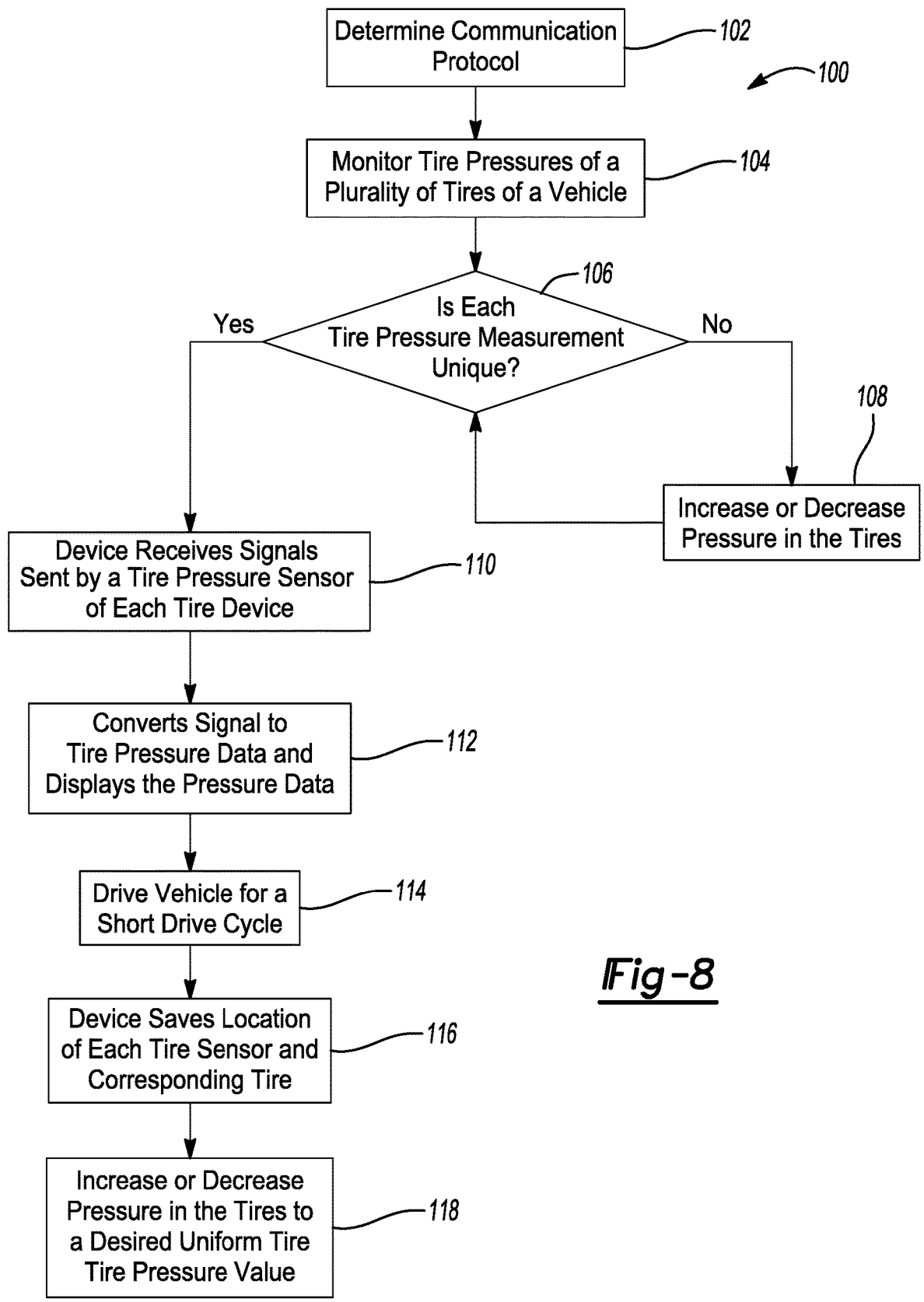
FIG. 8 is a flowchart of an example learning method for using a TPM display device and sensors associated with a tire in accordance with the principles of the present disclosure.

With reference to FIG. 3, as will be explained in more detail below, during operation of the TPM system, the device 10 may be disposed within, or in communication with, a vehicle (e.g., vehicle 16), and the processing system 32 may communicate with one or more of the primary sensors 50-1, 50-2, . . . 50-*n* (FIGS. 2 and 4) and one or more of the secondary sensors 52-1, 52-2, . . . 52-*n* (FIGS. 2 and 4). As previously described, the power input end 20 of the device 10 may be coupled to an auxiliary power outlet (not shown) of the vehicle 16. In some implementations, the device 10 is in communication with an infotainment system 60 of the vehicle 16. In this regard, the receiver 40 may include a transceiver operable to both receive signals from the sensors 50-*n*, 50-2 and transmit signals to the infotainment system 60. For example, the receiver 40 may transmit signals to the infotainment system 60, corresponding to an operation or the result of an operation performed by the processor 42, for display by the infotainment system.

As illustrated in FIG. 4, in some implementations, each primary sensor 50-1, 50-2, . . . 50-*n* and each secondary sensor 52-1, 52-2, . . . 52-*n* is associated with, or disposed on, a tire (e.g., tire 64-1, 64-2, . . . 64-*n*) of a vehicle (e.g., vehicle 16). In particular, a first primary sensor 50-1 and a first secondary sensor 52-1 may be disposed on a first tire 64-1 of the vehicle 16, a second primary sensor 50-2 and a second secondary sensor 52-2 may be disposed on a second tire 64-2 of the vehicle 16, a third primary sensor 50-3 and a third secondary sensor 52-3 may be disposed on a third tire 64-3 of the vehicle 16, and a fourth primary sensor 50-4 and a fourth secondary sensor 52-4 may be disposed on a fourth tire 64-4 of the vehicle 16. In this regard, while the vehicle 16 is generally shown and described herein as including four tires 64-*n*, it will be appreciated that the vehicle 16 may include any number of tires 64-*n* (e.g., more than four tires or less than four tires), each having a primary sensor 50-*n* and a secondary sensor 52-*n*. In some implementations, the primary sensor 50-*n* may communicate with the receiver 40 wirelessly through one of the 315 MHz RF protocol or the 433 MHz RF protocol, while the secondary sensor 52-*n* may communicate with the receiver 40 wirelessly through the other of the 315 MHz RF protocol or the 433 MHz RF protocol.

As previously described, during operation of the processing system 32, the sensors 50-*n*, 52-*n* may transmit signals to the receiver 40. The processor 42 may identify the sensors 50-*n*, 52-*n* based on the signals transmitted by the sensors 50-*n*, 52-*n*, or based on information entered by the user. For example, in some implementations, the processor 42 decodes the signals transmitted by the sensors 50-*n*, 52-*n* to determine an identity of the sensors 50-*n*, 52-*n*. In some implementations, the user inputs information through one or more of the user input members 34 to identify the sensors 50-*n*, 52-*n*. For example, the user may enter the year, make, or model of manufacture of the vehicle or tires on which the sensors 50-*n*, 52-*n* are disposed in order to determine an identity of the sensors 50-*n*, 52-*n*.

Based on the identity of the sensors 50-*n*, 52-*n*, the processor 42 may determine the protocol or control program corresponding to the sensors 50-*n*, 52-*n*. For example, the processor 42 may (i) locate or identify the sensors 50-*n*, 52-*n* in the memory 44 and (ii) identify or select the protocol corresponding to the sensors 50-*n*, 52-*n*. In particular, the processor 42 may locate the identity of the sensors 50-*n*, 52-*n* determined (i) based on the decoded signals or (ii) based on the information entered by the user, within the memory 44, and identify the protocol corresponding to the identity of the sensors 50-*n*, 52-*n*. As previously described, the identified protocol may correspond to the manufacturer (e.g., GENERAL MOTORS®, FORD®, etc.) of the vehicle or the tires. The processor 42 may load or save the identified protocol into the program memory 53 for execution.

With reference to FIGS. 5-8, a method 100 of determining a location of one or more sensors (e.g., sensors 50-*n*, 52-*n*) and one or more conditions at a tire (e.g., tires 54-*n*) begins at block 102 where the method may include determining a communication protocol corresponding to one or more of the primary sensors 50-*n* and one or more of the secondary sensors 52-*n*. As illustrated in FIG. 5, in some implementations, at block 102 the method 100 includes illustrating a vehicle or sensor identification selection on the display 30. In particular, the user may input various identifying characteristics corresponding to the vehicle (e.g., vehicle 16) or the sensors 50-*n*, 52-*n*. For example, the user may input the make, model, or year of the vehicle 16. In some implementations, at block 102 the primary sensors 50-*n* and the secondary sensors 52-*n* may transmit to the receiver 40 a primary ID and a secondary ID, respectively, identifying and unique to the primary and secondary sensors 50-*n*, 52-*n*, and the receiver 40 transmits the primary or secondary IDs to the processor 42.

The processor 42 may communicate with the memory 44 to determine the communication protocol corresponding to the primary sensors 50-*n* or the secondary sensors 52-*n*. For example, at block 102, the processor 42 may transmit (i) the identifying characteristics (e.g., year, make, model, etc.) of the vehicle or (ii) the primary or secondary IDs to the memory 44. The processor 42 may locate the identifying characteristics of the vehicle, the primary ID of the primary sensors 50-*n*, or the secondary ID of the secondary sensors 52-*n* in the database 56 of the memory 44, and determine the communication protocol corresponding to the primary sensors 50-*n* or the secondary sensors 52-*n* based on one or more of the identifying characteristics of the vehicle, the primary ID of the primary sensors 50-*n*, or the secondary ID of the secondary sensors 52-*n*. In some implementations, the primary sensors 50-*n* and the secondary sensors 52-*n* utilize the same communication protocol (e.g., one of the 315 MHz RF protocol or the 433 MHz RF protocol), such that only the ID differs, and needs to be taught to the display device 14, between the various sensors 50-*n*, 52-*n*. In this regard, the make, model, or year of the vehicle 16 selection of block 102 may determine the communication protocol corresponding to the primary sensors 50-*n* or the secondary sensors 52-*n*.

At block 104, the method 100 may include monitoring one or more conditions at one or more tires (e.g., tires 54-*n*) of a vehicle (e.g., vehicle 16). For example, in some implementations, the primary sensors 50-*n* and the secondary sensors 52-*n* sense the air pressure within, and the temperature at, each tire of the vehicle, and transmit the conditions to the receiver 40. In some implementations, the received tire information or conditions is linked in an application (e.g., the previously-described communication application) with global positioning system values or coordinates for each tire or sensor 50-*n*, 52-*n*. With reference to FIG. 4, in some implementations, a user may utilize a tool 105 (e.g, a gauge, a thermometer, etc.) to measure the air pressure within, and the temperature at, each tire of the vehicle.

At block 106, the method 100 may include determining whether each air pressure value sensed by each primary sensor 50-*n* is unique. For example, the receiver 40 may transmit the air pressure values, measured at block 104, to the processor 42, and the processor may determine whether each air pressure value measured at block 104 is different than the other air pressure values measured at block 104. If block 106 is false, the method 100 may proceed to block 108 where the method 100 may include changing the air pressure in one or more of the tires of the vehicle 16. For example, at block 108, the user may add air to, or remove air from, one or more of the tires of the vehicle 16 in order to increase or decrease the air pressure within the tire, and the method 100 may return to 106.

If block 106 is true, the method 100 may proceed to block 110, where the method may include receiving signals transmitted by the primary sensors 50-*n* or the secondary sensors 52-*n*. For example, at block 110 the primary sensors 50-*n* and the secondary sensors 52-*n* may transmit signals corresponding to the air pressure and temperature at each tire 54-*n* to the receiver 40, and the receiver 40 may transmit the signals to the processor 42 for processing.

At block 112, the method 100 may include processing or displaying data sensed by the primary sensors 50-*n* or the secondary sensors 52-*n*. Based on the communication protocols determined at block 102, the processor 42 may determine the air pressure and temperature at each tire 54-*n* corresponding to the signals transmitted by the primary and secondary sensors 50-*n*, 52-*n*, respectively. The processor 42 may transmit the air pressure and temperature values to the display 30 for visualization by the user. For example, with reference to FIG. 6, in a first mode the display 30 may illustrate the air pressure values at each tire 54-*n*, corresponding to the signals transmitted by each primary sensors 50-*n*. With reference to FIG. 7, in a second mode, the display 30 may illustrate the temperature values at each tire 54-*n*, corresponding to the signals transmitted by each secondary sensors 52-*n*.

At block 114, the method 100 may include driving the vehicle 16 for a predetermined distance or amount of time. For example, the user may drive the vehicle 16 for a distance less than twenty minutes or an amount of time less than one hour. In some implementations, the user may drive the vehicle for a distance less than ten minutes or an amount of time less than thirty minutes.

At block 116, the method 100 may include saving the location of each sensor 50-*n*, 52-*n* in a memory (e.g., memory 44), such that each sensor 50-*n*, 52-*n* corresponds to a tire 54-*n* of the vehicle. For example, the method may including saving in the memory 44 (i) the location of the first primary sensor 50-1 and the first secondary sensor 52-1 relative to a tire 54-*n* of the vehicle, (ii) the location of the second primary sensor 50-2 and the second secondary sensor 52-2 relative to a tire 54-*n* of the vehicle, (iii) the location of the third primary sensor 50-3 and the third secondary sensor 52-3 relative to a tire 54-*n* of the vehicle, and (iv) the location of the fourth primary sensor 50-4 and the fourth secondary sensor 52-4 relative to a tire 54-*n* of the vehicle. In particular, the receiver 40 may receive signals from the first, second, third, and fourth primary sensors 50-1, 50-2, 50-3, 50-4, and from the first, second, third, and fourth secondary sensors 52-1, 52-2, 52-3, 52-4, and processor 42 may save the locations of the sensors in the memory 44. In some implementations, the method includes repeating block 116, such that the receiver 40 receives two or more signals from each sensor 50-*n*, 52-*n* prior to the processor 42 saving the location of each sensor 50-*n*, 52-*n* to the memory 44, in order to ensure accurate identification of each sensor.

At block 118, the method may include changing the air pressure in one or more of the tires 54-*n* of the vehicle 16. For example, at block 118, the user may add air to, or remove air from, one or more of the tires of the vehicle 16 in order to increase or decrease the air pressure within the tire to a predetermined value.

In some implementations, the method may also include activating a warning based on the air pressure, or change thereof, in one or more of the tires of the vehicle 16, or based the temperature at one or more of the tires of the vehicle 16, or if the processing system 32 malfunctions. For example, upon the occurrence of an air pressure event, such as if the air pressure in one or more of the tires of the vehicle 16 drops by a predetermined percentage (e.g., more than 15% or more than 20%, or more than some other percentage determined by the user), or if the air pressure in one or more of the tires of the vehicle 16 is below a predetermined threshold (e.g., twenty-two pounds per square inch, or some other fixed pressure threshold per tire or per axle of the vehicle), the processor 42 may instruct the indicator 46 to produce a sound, a light, a vibration, or other identifiable warning message to notify the user of the air pressure event. Similarly, upon the occurrence of a temperature event, such as if the temperature at one or more of the tires of the vehicle 16 is above a predetermined threshold value (e.g., two hundred degrees Fahrenheit) or below a predetermined threshold value (e.g., ten degrees Fahrenheit), the processor 42 may instruct the indicator 46 to produce a sound, a light, a vibration, or other identifiable warning message to notify the user of the air pressure event.

The device 10 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document. For example, each of the components 40, 42, 44, 46, 50-$n$, 52-$n$, 53, are interconnected using various busses, and may be mounted on a common motherboard or in other manners as appropriate. The processor 42 can process instructions for execution within the device 10, including instructions stored in the memories, 44, 53 to display graphical information for a graphical user interface (GUI) on an external input/output device, such as display 30 coupled to a high speed interface. In other implementations, multiple processors and/or multiple buses may be used, as appropriate, along with multiple memories and types of memory. Also, multiple devices 10 may be connected, with each device providing portions of the necessary operations.

The memories 44, 53 store information non-transitorily within the device 10, and may be a computer-readable medium, a volatile memory unit(s), or non-volatile memory unit(s). The memories 44, 53 may be physical devices used to store programs (e.g., sequences of instructions) or data (e.g., program state information) on a temporary or permanent basis for use by the device 10. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The memory 44 is capable of providing mass storage for the device 10. In some implementations, the memory 44 is a computer-readable medium. In various different implementations, the memory 44 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memories 44, 53.

The device may also include a high speed controller (not shown) that manages bandwidth-intensive operations for the device 10, while a low speed controller (not shown) manages lower bandwidth-intensive operations. Such allocation of duties is exemplary only. In some implementations, the high-speed controller is coupled to the memory 44, the display 30 (e.g., through a graphics processor or accelerator), and to high-speed expansion ports, which may accept various expansion cards (not shown). In some implementations, the low-speed controller is coupled to the memory 44 and a low-speed expansion port. The low-speed expansion port may include various communication ports (e.g., USB, Bluetooth, Ethernet, wireless Ethernet), and may be coupled to one or more input/output devices, such as a keyboard, a pointing device, a scanner, or a networking device such as a switch or router, e.g., through a network adapter. In some implementations, a user may update the instructions (e.g., software or firmware) stored on the memory 44 via the low-speed expansion port (e.g., USB or Bluetooth).

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A method for linking tire sensors with a tire pressure monitoring device comprising:

monitoring a first tire pressure corresponding to a first tire mounted on a vehicle;

monitoring a second tire pressure corresponding to a second tire mounted on a vehicle;

determining whether the first tire pressure is different than the second tire pressure;

receiving, by a tire pressure monitoring device, a signal from a first sensor corresponding to one of the first tire or the second tire;

receiving, by the tire pressure monitoring device, a signal from a second sensor corresponding to one of the first tire or the second tire;

saving, by the tire pressure monitoring device, a location of the first sensor relative to the first tire and the second tire based on the tire pressure of the first tire and the second tire; and saving, by the tire pressure monitoring device, a location of the second sensor relative to the first tire and the second tire based on the tire pressure of the first tire and the second tire.

2. The method of claim 1, further comprising the step of displaying, by the tire pressure monitoring device, the tire pressure corresponding to the first tire and the tire pressure corresponding to the second tire.

3. The method of claim 1, wherein the first tire includes a left front tire and the second tire includes a right front tire, the left front tire having a tire pressure less than a tire pressure of the right front tire.

4. The method of claim 1, further comprising the step of modifying one of the tire pressure of the first tire or the tire pressure of the second tire such that the tire pressure of the first tire equals the tire pressure of the second tire after the location of the first sensor and the second sensor is saved by the tire pressure monitoring device.

5. The method of claim 1, wherein the first sensor and the second sensor correspond to a first original equipment manufacturer.

6. The method of claim 5, wherein the tire pressure monitoring device is capable of receiving signals from a third sensor and a fourth sensor corresponding to a second original equipment manufacturer.

7. The method of claim 1, wherein the tire pressure monitoring device includes a power unit removably engaged with a power source of the vehicle.

8. The method of claim 7, wherein the power source of the vehicle includes a USB port.

9. The method of claim 7, wherein the power source of the vehicle includes an auxiliary power receptacle.

* * * * *